US012732555B2

(12) United States Patent
Yang et al.

(10) Patent No.: US 12,732,555 B2
(45) Date of Patent: Sep. 8, 2026

(54) PACKET PROCESSING METHOD, DEVICE, STORAGE MEDIUM AND COMPUTER PROGRAM PRODUCT

(71) Applicant: Cloud Intelligence Assets Holding (Singapore) Private Limited, Singapore (SG)

(72) Inventors: Yang Yang, Hangzhou (CN); Huajun Hu, Shenzhen (CN); Feng Li, Hangzhou (CN); Shoujing Bo, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 0 days.

(21) Appl. No.: 18/688,386

(22) PCT Filed: Aug. 31, 2022

(86) PCT No.: PCT/CN2022/116344
§ 371 (c)(1),
(2) Date: Mar. 1, 2024

(87) PCT Pub. No.: WO2023/030417
PCT Pub. Date: Mar. 9, 2023

(65) Prior Publication Data

US 2025/0126169 A1 Apr. 17, 2025

(30) Foreign Application Priority Data

Sep. 1, 2021 (CN) ......................... 202111022448.X

(51) Int. Cl.
*H04L 67/1034* (2022.01)
*H04L 45/745* (2022.01)

(52) U.S. Cl.
CPC ........ *H04L 67/1034* (2013.01); *H04L 45/745* (2013.01)

(58) Field of Classification Search
None
See application file for complete search history.

(56) References Cited

U.S. PATENT DOCUMENTS

2012/0042049 A1* 2/2012 Miyazaki ............ H04L 41/0677 709/219
2012/0218974 A1 8/2012 Zhou et al.
(Continued)

FOREIGN PATENT DOCUMENTS

CN 102130800 A 7/2011
CN 102761428 A 10/2012
(Continued)

OTHER PUBLICATIONS

Wang W. Guyet T. et al. “An Experimental Study of Detection and Prediction of Traffic Anomalies in Computer Networks.” Published in 2018.
(Continued)

*Primary Examiner* — Phyllis A Book
(74) *Attorney, Agent, or Firm* — Osha Bergman Watanabe & Burton LLP

(57) ABSTRACT

Embodiments of the present disclosure provide a packet processing method, a device, a storage medium and a computer program product. The method includes: obtaining a to-be-processed packet; determining a first server corresponding to the to-be-processed packet; updating the first server to a second server when a running state of the first server is an abnormal state, where a running state of the second server is a normal state; editing the to-be-processed packet corresponding to the first server based on the second server, to obtain a processed packet, where the processed
(Continued)

packet includes configuration information of the second server.

18 Claims, 6 Drawing Sheets

(56) References Cited

U.S. PATENT DOCUMENTS

| | | | | |
|---|---|---|---|---|
| 2016/0182378 | A1* | 6/2016 | Basavaraja | H04L 69/22 370/235 |
| 2017/0163724 | A1 | 6/2017 | Puri et al. | |
| 2022/0337514 | A1 | 10/2022 | Lu et al. | |

FOREIGN PATENT DOCUMENTS

| | | | | |
|---|---|---|---|---|
| CN | 103716240 | A | 4/2014 | |
| CN | 104243205 | A | 12/2014 | |
| CN | 105471613 | A | 4/2016 | |
| CN | 105577723 | A | 5/2016 | |
| CN | 105791169 | A | 7/2016 | |
| CN | 108123890 | A | 6/2018 | |
| CN | 108777640 | A | 11/2018 | |
| CN | 108881066 | A * | 11/2018 | H04L 47/70 |
| CN | 111478851 | A | 7/2020 | |
| CN | 113079089 | A | 7/2021 | |
| CN | 113297038 | A | 8/2021 | |
| CN | 113300971 | A | 8/2021 | |
| CN | 113326228 | A | 8/2021 | |
| CN | 113472900 | A | 10/2021 | |

OTHER PUBLICATIONS

Teng Cui et al. "On the Detection and Prediction of Abnormal Computer Network Traffic" Network & Communication. China Academic Journal Electronic Publishing House. 1994-2024.
International Search Report dated Oct. 24, 2022, for International Application No. PCT/CN2022/116344.
CN Office Action dated Oct. 12, 2021 in connection with Application Serial No. 202111022448.X.
CN Office Action dated Nov. 8, 2021 in connection with Application Serial No. 202111022448.X.
CN Notice of Allowance dated Nov. 23, 2021 in connection with Application Serial No. 202111022448.X.

* cited by examiner

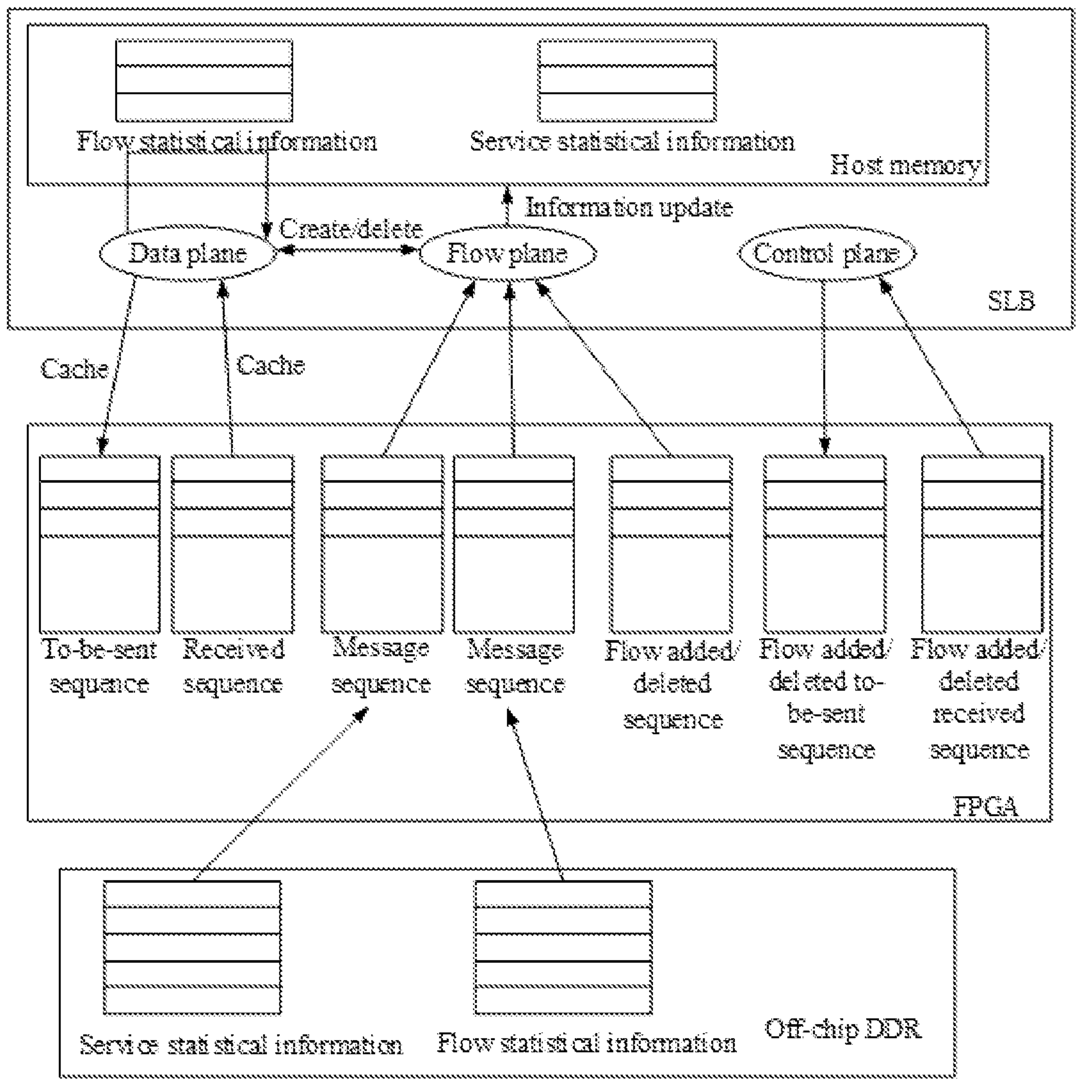

FIG. 10

Determine, in response to invoking a packet processing request, a processing resource corresponding to a packet processing service — S1101

Perform following steps by using the processing resource: obtaining a to-be-processed packet; determining a first server corresponding to the to-be-processed packet; updating the first server to a second server when a running state of the first server is an abnormal state, where a running state of the second server is a normal state; editing the to-be-processed packet corresponding to the first server based on the second server, to obtain a processed packet, where the processed packet includes configuration information of the second server — S1102

FIG. 11

PACKET PROCESSING METHOD, DEVICE, STORAGE MEDIUM AND COMPUTER PROGRAM PRODUCT

CROSS-REFERENCE TO RELATED APPLICATIONS

This application is a National Stage of International Application No. PCT/CN2022/116344, filed on Aug. 31, 2022, which claims priority to Chinese patent application No. 202111022448.X, entitled "PACKET PROCESSING METHOD, DEVICE, STORAGE MEDIUM AND COMPUTER PROGRAM PRODUCT" and filed with the China National Intellectual Property Administration on Sep. 1, 2021. The disclosures of the aforementioned applications are hereby incorporated by reference in their entireties.

TECHNICAL FIELD

The present disclosure relates to the field of packet technology and, in particular, to a packet processing method, a device, a storage medium and a computer program product.

BACKGROUND

A server load balancer (SLB) system can provide load balancing services based on data plane development kit (DPDK) and an X86 software technology. Specifically, the SLB system may be set up between a client and a server. During data transmission between the client and the server, the SLB system may determine a CPU among multiple processors (CPU) for analyzing and processing data, and then use the CPU to send the data to the corresponding server for processing.

However, when a server used to analyze and process data is in an abnormal state, if the data continues to be sent to the corresponding server, the server is not able to process the data normally and network packet loss occurs accordingly, which degrades data processing performance.

SUMMARY

Embodiments of the present disclosure provide a packet processing method, a device, a storage medium and a computer program product, which can effectively avoid data processing performance loss in user stress testing and malicious attack scenarios, and in turn help to improve stability of analyzing and processing a packet.

In a first aspect, an embodiment of the present disclosure provides a packet processing method, including:

obtaining a to-be-processed packet;

determining a first server corresponding to the to-be-processed packet;

updating the first server to a second server when a running state of the first server is an abnormal state, where a running state of the second server is a normal state; and editing the to-be-processed packet corresponding to the first server based on the second server, to obtain a processed packet, where the processed packet includes configuration information of the second server.

In a second aspect, an embodiment of the present disclosure provides a packet processing apparatus, including:

a first obtaining module, configured to obtain a to-be-processed packet;

a first determination module, configured to determine a first server corresponding to the to-be-processed packet;

a first update module, configured to update the first server to a second server when a running state of the first server is an abnormal state, where a running state of the second server is a normal state; and a first processing module, configured to edit the to-be-processed packet corresponding to the first server based on the second server, to obtain a processed packet, where the processed packet includes configuration information of the second server.

In a third aspect, an embodiment of the present disclosure provides an electronic device, including: a memory and a processor, where the memory is used to store one or more computer instructions which, when executed by the processor, implement the packet processing method in the first aspect described above.

In a fourth aspect, an embodiment of the present disclosure provides a computer storage medium storing a computer program which, when executed by a computer, enables the computer to implement the packet processing method in the first aspect described above.

In a fifth aspect, an embodiment of the present disclosure provides a computer program product, including: a computer-readable storage medium storing computer instructions which, when executed by one or more processors, enable the one or more processors to execute steps of the packet processing method in the first aspect described above.

In a sixth aspect, an embodiment of the present disclosure provides a packet processing method, including:

determining, in response to invoking a packet processing request, a processing resource corresponding to a packet processing service; and performing following steps by using the processing resource: obtaining a to-be-processed packet; determining a first server corresponding to the to-be-processed packet;

updating the first server to a second server when a running state of the first server is an abnormal state, where a running state of the second server is a normal state; editing the to-be-processed packet corresponding to the first server based on the second server, to obtain a processed packet, where the processed packet includes configuration information of the second server.

In a seventh aspect, an embodiment of the present disclosure provides a packet processing apparatus, including:

a second determination module, configured to determine, in response to invoking a packet processing request, a processing resource corresponding to a packet processing service; and a second processing module, configured to perform following steps by using the processing resource: obtaining a to-be-processed packet; determining a first server corresponding to the to-be-processed packet; updating the first server to a second server when a running state of the first server is an abnormal state, where a running state of the second server is a normal state; editing the to-be-processed packet corresponding to the first server based on the second server, to obtain a processed packet, where the processed packet includes configuration information of the second server.

In an eighth aspect, an embodiment of the present disclosure provides an electronic device, including: a memory and a processor, where the memory is used to store one or more computer instructions which, when executed by the processor, implement the packet processing method in the sixth aspect described above.

In a ninth aspect, an embodiment of the present disclosure provides a computer storage medium storing a computer program which, when executed by a computer, enables the computer to implement the packet processing method in the sixth aspect described above.

In a tenth aspect, an embodiment of the present disclosure provides a computer program product, including: a computer-readable storage medium storing computer instructions, which, when executed by one or more processors, enable the one or more processors to execute steps of the packet processing method in the sixth aspect described above.

In the technical solution provided by the embodiments, by obtaining the to-be-processed packet, determining the first server corresponding to the to-be-processed packet, updating the first server to the second server when the running state of the first server is the abnormal state, in which the running state of the second server is the normal state, and then editing the to-be-processed packet based on the second server to obtain the processed packet, following achievement is thus effectively achieved: when the first server used for packet processing is in an abnormal state, the first server can be quickly and promptly replaced with the second server in the normal state, so as to perform a corresponding processing operation on the to-be-processed packet by using the second server which is running normally. It can effectively avoid data processing performance loss in user stress testing and malicious attack scenarios, and in turn help improve stability of analyzing and processing a packet.

BRIEF DESCRIPTION OF DRAWINGS

In order to more clearly illustrate technical solutions of embodiments of the present disclosure or the prior art, a brief introduction will be made below to drawings required for the description of the embodiments or the prior art. Obviously, the drawings in the following description are for some embodiments of the present disclosure. For those of ordinary skill in the art, other drawings can be obtained based on these drawings without creative effort.

FIG. 10 is a schematic diagram of a principle of a packet processing method provided by an application embodiment of the present disclosure.

FIG. 11 is a schematic flowchart of yet another packet processing method provided by an embodiment of the present disclosure.

DESCRIPTION OF EMBODIMENTS

In order to make purpose, technical solutions and advantages of embodiments of the present disclosure more clear, the technical solutions of the embodiments of the present disclosure will be clearly and comprehensively described below in conjunction with the drawings of the embodiments of the present disclosure. Obviously, the described embodiments are some embodiments of the present disclosure, rather than all embodiments.

All other embodiments obtained by those of ordinary skill in the art based on the embodiments in the present disclosure without creative effort fall within the protection scope of the present disclosure.

The terminology used in the embodiments of the present disclosure is only for the purpose of describing specific embodiments and is not intended to limit the present disclosure. As used in the embodiments and the appended claims, the singular forms of "a," "the" and "said" are intended to include the plural forms as well, unless the context clearly dictates other meanings. "A plurality of" generally includes at least two, but is not intended to exclude an inclusion of at least one.

It should be understood that the term "and/or" used herein is only to describe an association relationship between related objects, indicating that there can be three types of relationship, for example, A and/or B, which can mean three situations: A exists alone; A and B exist simultaneously; B exists alone. In addition, the character "/" herein generally indicates that the related objects are in an "or" relationship.

Depending on the context, words "if" or "in a case that" as used herein may be interpreted as "at a time when" or "when" or "in response to a determination of" or "in response to a detection of". Similarly, depending on the context, phrases "if it is determined that" or "if it is detected that (a stated condition or event)" may be interpreted as "when it is determined that" or "in response to a determination of" or "when detecting (a stated condition or event)" or "in response to a detection of (a stated condition or event)".

It should also be noted that the terms "include", "comprise" or any other variations thereof are intended to cover a non-exclusive inclusion, such that a product or a system including a series of elements includes not only those elements but also other not expressly listed elements, or elements inherent to the product or the system. Without further limitation, an element defined by a statement "comprises a . . . " does not exclude the presence of other identical elements in the product or the system that includes the stated element.

In addition, the sequence of steps in the following method embodiments is only an example and is not strictly limited.

In order to facilitate understanding of the specific implementation process and implementation effects of the packet processing method in the embodiments, the relevant technology is briefly described below.

Figure 1:
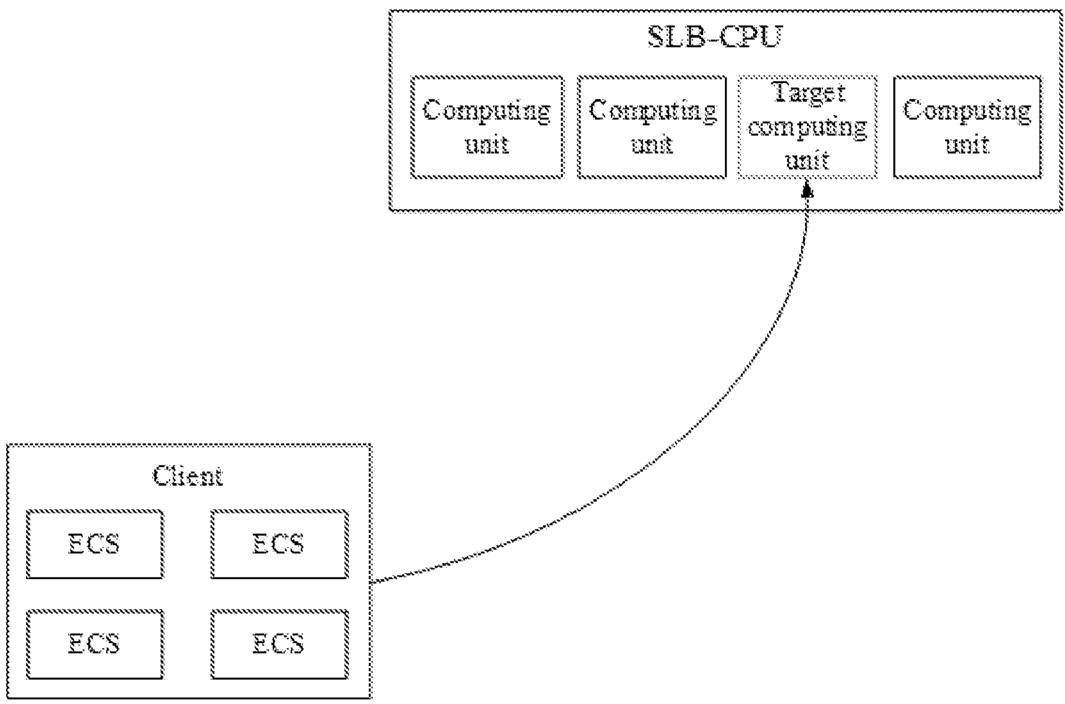
FIG. 1 is a schematic diagram of a principle of a packet forwarding method provided by an embodiment in a related art.
Figure 2:
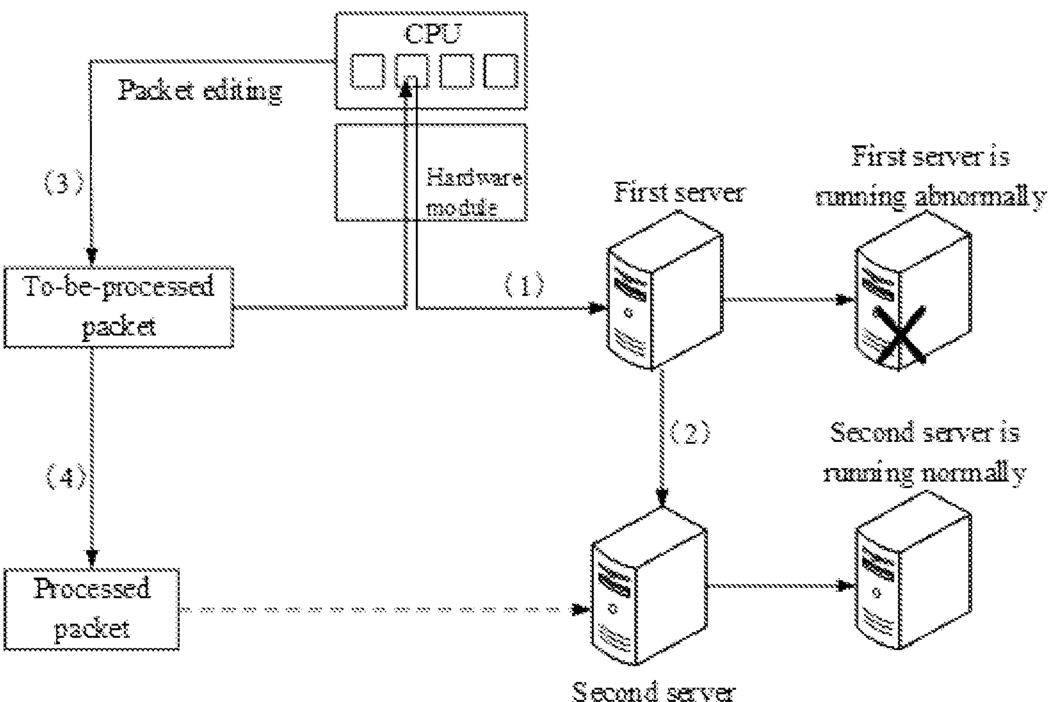
FIG. 2 is a block diagram of a principle of a packet processing method provided by an embodiment of the present disclosure.

A server load balancer (SLB) system can provide load balancing services based on data plane development kit (DPDK) and X86 software technology. Specifically, the SLB system can be set up between a client and a server. The SLB system can include a processor (CPU), which may be a multi-core CPU, that is, the CPU includes multiple computing units for analyzing and processing data. During data transmission between the client and the server, the SLB system can determine a target computing unit among multiple computing units for analyzing and processing the data. For example, as shown in FIG. 1, the CPU in the SLB system includes 4 computing units for analyzing and processing the data. After the data sent by the client (any ECS) is obtained, a target computing unit for analyzing and processing the data can be selected from the four computing units, and then the data is sent to the corresponding server for processing by using the target computing unit.

With the continuous development of processor technology, the data processing performance of the CPU has reached a bottleneck period. For example, a maximum packet processing speed of a CPU is 1 million packets/s, etc. At this time, if the user uses a high-performance cloud server (Elastic Compute Service, ECS) to perform stress detection, due to the high packet forwarding and processing speed in the above application scenario, 28 million packets/s can be reached, if the CPU is used to process the data packets in the above application scenario, the number of packets that need to be processed will easily exceed the processing limit of the CPU, that is, a scenario of the SLB single core being fully loaded occurs, which will easily lead to data processing performance loss.

In order to solve the above technical problem, the related art provides a load balancing system based on a general network interface card (such as mellanox connectx-5 network interface card) that implements a combination of software and hardware. However, the above implementation method has the following defects:

(1) network interface card capabilities in the above load balancing system are relatively general and cannot meet the personalized needs of users;

(2) the processor can achieve higher performance only when a table entry size is small; for example, when there are more than 10 thousand flows in the table entry, forwarding performance of the hardware drops sharply, while 10 thousand flows are easily reached in a stress test scenario;

(3) when a real server (RS) used to respond to the packets fails, the corresponding data in the load balancing system cannot be updated based on the failure of the RS dimension; for example, an access control list (ACL) corresponding to the real server cannot be updated, making it impossible to normally perform subsequent data processing operations; and (4) a data backfilling operation of each flow is not supported; for example, for a data flow, backfilling of the ack sequence number (ack num) of the TCP protocol is not supported; at this time, when the data flow ages out, the SLB system cannot send out a packet for closing connection (a rst packet) carrying a correct sequence (seq-num), which makes it impossible to close the connection between the client and the server. In addition, the support for the TCP protocol is not thorough enough, for example, supporting modifying the ack sequence number of the TCP, but leaving a sack option in TCP not modified.

In order to solve the above technical problems, the embodiments provide a packet processing method, a device, a storage medium and a computer program product. An execution body of the packet processing method can be a packet processing apparatus with a load balancing capability. As for a specific implementation, the packet processing apparatus can be implemented as a network interface card. Specifically, the network interface card can include a software module (CPU) and a hardware module. The software module can include a virtual switch (vswitch) responsible for normal VPC network traffic forwarding operations. Specifically, the software module can obtain the five-tuple characteristics of the packet, query various forwarding tables such as a routing table and an ACL table, through the five-tuple characteristics, to obtain query results, and then generate a second flow table based on the query results and the five-tuple characteristics. For the hardware module, a field programmable gate array (FPGA) or an application specific integrated circuit (ASIC) may be adopted. The hardware module can unload the second flow table issued by the software vswitch, to serve as a first flow table, to implement a fast packet forwarding operation. Specifically, during the packet processing operation:

physical machine/virtual machine: used to generate a to-be-processed packet and send the to-be-processed packet to the network interface card;

hardware module of the network interface card: used to obtain the to-be-processed packet and detect whether the to-be-processed packet hits (matches) a preset first flow table;

if not, send the to-be-processed packet to the software module of the network interface card; and software module of the network interface card: used to obtain the to-be-processed packet, analyze and process the to-be-processed packet based on a second flow table, determine a first server corresponding to the to-be-processed packet, detect a running state of the first server, update the first server to a second server when the running state of the first server is an abnormal state, where a running state of the second server is a normal state, and then edit the to-be-processed packet corresponding to the first server based on the second server, to obtain a processed packet, where the processed packet includes configuration information of the second server.

In other examples, the hardware module of the network interface card is also used to: directly analyze and process the to-be-processed packet based on the first flow table when the to-be-processed packet hits the first flow table; and determine a first server corresponding to the to-be-processed packet, detect a running state of the first server, update the first server to a second server when the running state of the first server is an abnormal state, where a running state of the second server is a normal state, and then send the to-be-processed packet and the second server to the software module; and the software module is also used to edit the to-be-processed packet based on the second server, to obtain a processed packet, where the processed packet includes configuration information of the second server.

In some instances, in order to improve the hit rate between the packet and the first flow table in the hardware module, the hardware module can be allocated with a storage space. The storage space can include at least one of: an on-chip cache corresponding to the hardware module, an off-chip storage space corresponding to the hardware module. The first flow table is then stored in the above-mentioned storage space. Since the storage space is large, there are many entries in the first flow table, which can greatly improve the packet forwarding capability of the entire system.

The technical solution provided by the embodiments realizes the processing of packets in a combination of software and hardware, which can greatly improve the packet forwarding capability of the entire system. In addition, when analyzing and processing the packet, if the first server corresponding to the to-be-processed packet runs abnormally, the first server can be promptly updated to the second server that runs normally, so as to perform editing on the to-be-processed packet by using the second server, to obtain a processed packet. The following achievement is thus effectively recognized: when it is determined that an abnormity occurs to the first server used for packet processing, the first server can be quickly and promptly updated to the second server which is in a normal state, so as to perform corresponding processing operation on the to-be-processed packet by using the second server which is running normally. It can effectively avoid service loss in user stress testing and malicious attack scenarios, and in turn help improve the performance and stability of analyzing and processing packets.

Some embodiments of the present disclosure will be described in detail below with reference to the drawings. The following embodiments and features in the embodiments may be combined with each other as long as there is no conflict between the embodiments.

Figures 3, 4, 5:
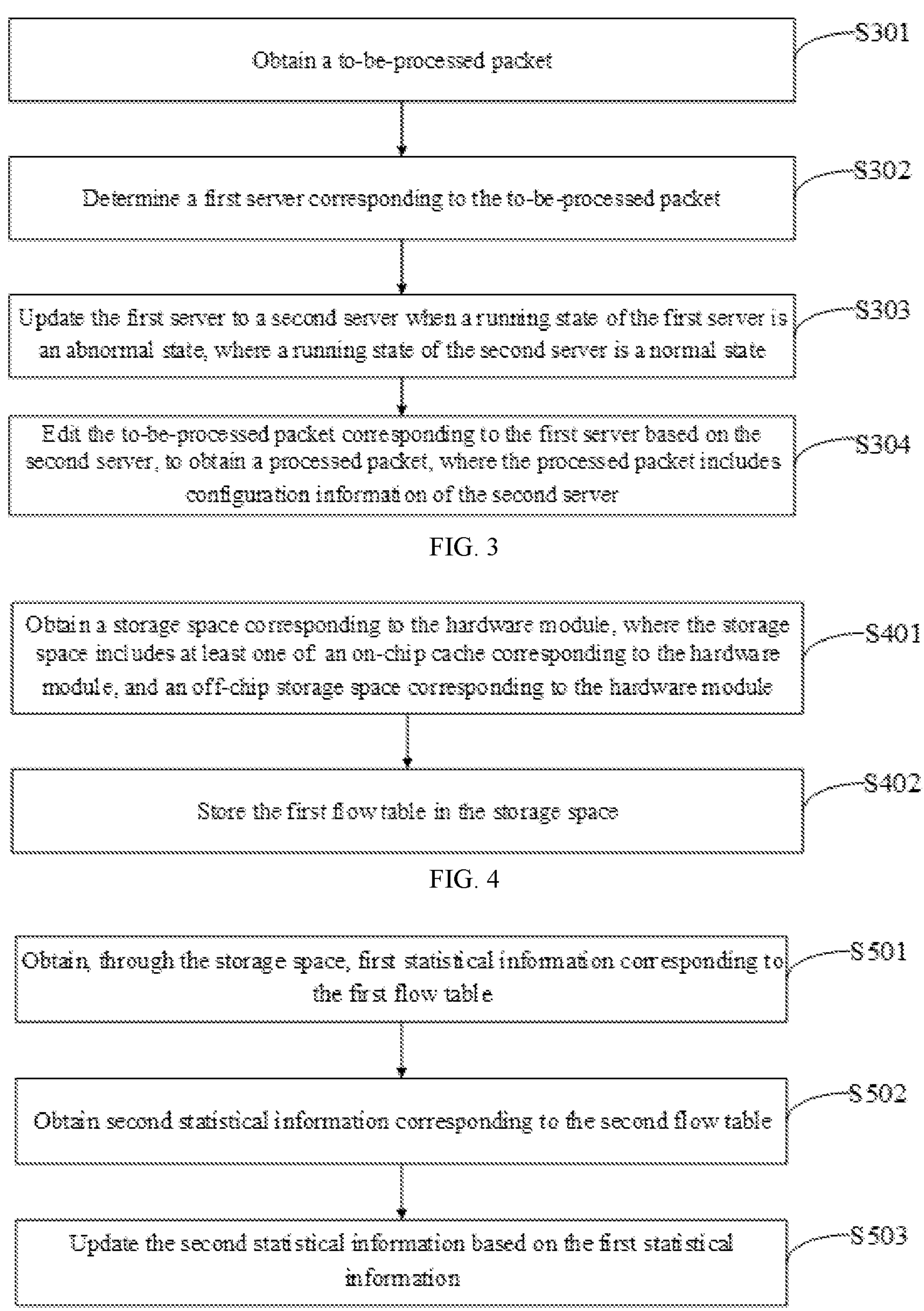
FIG. 3 is a schematic flowchart of a packet processing method provided by an embodiment of the present disclosure.
FIG. 4 is a schematic flowchart of another packet processing method provided by an embodiment of the present disclosure.
FIG. 5 is a schematic flowchart of yet another packet processing method provided by an embodiment of the present disclosure.

FIG. 3 is a schematic flowchart of a packet processing method provided by an embodiment of the present disclosure. Referring to FIG. 3, the embodiment provides a packet processing method. The execution body of the method is a packet processing apparatus. It can be understood that the packet processing apparatus can be implemented as software, or a combination of software and hardware. For specific implementation, the packet processing apparatus can be implemented as a network interface card. The packet processing method may include:

step S301: obtain a to-be-processed packet;

step S302: determine a first server corresponding to the to-be-processed packet;

step S303: update the first server to a second server when a running state of the first server is an abnormal state, where a running state of the second server is a normal state; and step S304: edit the to-be-processed packet corresponding to the first server based on the second server, to obtain a processed packet, where the processed packet includes configuration information of the second server.

A specific implementation process and implementation effects of each of the above steps are described in detail below.

Step S301: obtain a to-be-processed packet.

When a user has a data access need, a to-be-processed packet can be generated through a physical machine or a virtual machine. Specifically, the physical machine/the virtual machine can provide an interface or a port for the user to input an executing operation, and the executing operation input by the user can be obtained through the interface or the port. The to-be-processed packet can be generated through the executing operation. It is understandable that in different application scenarios, the generated to-be-processed packet can correspond to a different function. For example, there may be a to-be-processed packet for implementing a data access operation, a to-be-processed packet for implementing a control operation, a to-be-processed packet for implementing a response operation, etc.

After the physical machine/the virtual machine generates the to-be-processed packet, the to-be-processed packet can be sent to the packet processing apparatus. It can be understood that the number of to-be-processed packets that the packet processing apparatus can obtain at a same time point can be one or more. During the specific implementation, the physical machine or the virtual machine is configured with a driver module for implementing a data transmission operation. Through the driver module, the to-be-processed packet can be sent from the physical machine or the virtual machine to the packet processing apparatus, so that the packet processing apparatus can obtain the to-be-processed packet stably and effectively.

Step S302: determine a first server corresponding to the to-be-processed packet.

After the to-be-processed packet is obtained, the to-be-processed packet can be analyzed and processed to determine the first server corresponding to the to-be-processed packet. In some instances, the determining the first server corresponding to the to-be-processed packet can include: obtaining a flow table for analysis and processing of the to-be-processed packet; and determining the first server corresponding to the to-be-processed packet based on the flow table.

After the to-be-processed packet is obtained, a flow table for analysis and processing of the to-be-processed packet can be obtained. The flow table can include at least one of: a first flow table located in a hardware module or a second flow table located in a software module. It can be understood that the above-mentioned first flow table is used for a fast forwarding operation of a packet, and the second flow table is used for a normal forwarding operation of a packet. After the flow table is obtained, the flow table can be used for analysis and processing of the to-be-processed packet to determine the first server corresponding to the to-be-processed packet. In some instances, the determining the first server corresponding to the to-be-processed packet based on the flow table includes: determining the first server corresponding to the to-be-processed packet based on the first flow table, when the to-be-processed packet hits the first flow table; and determining the first server corresponding to the to-be-processed packet based on the second flow table, when the to-be-processed packet does not hit the first flow table.

Specifically, after the first flow table located in the hardware module and the second flow table located in the software module are obtained, it may be first detected whether the to-be-processed packet hits the first flow table. Specifically, the detecting whether the to-be-processed packet hits the first flow table can include: determining five-tuple information (a source IP address, a destination IP address, a protocol number, a source port, a destination port) and executing operation information (action) corresponding to the to-be-processed packet, and detecting, based on the five-tuple and the executing operation, whether the to-be-processed packet hits the first flow table; when the first flow table includes the five-tuple and the executing operation corresponding to the to-be-processed packet, determining that the to-be-processed packet hits the first flow table; and when the first flow table does not include the five-tuple and the executing operation corresponding to the to-be-processed packet, determining that the to-be-processed packet does not hit the first flow table.

When the to-be-processed packet hits the first flow table, it means that the hardware module can directly forward the to-be-processed packet at this time. At this time, in order to implement the packet forwarding operation, the first server corresponding to-be-processed packet can first be determined based on the first flow table. The first server is used to perform a corresponding data processing operation on the to-be-processed packet. When the to-be-processed packet does not hit the first flow table, it means that the hardware module cannot directly forward the to-be-processed packet at this time, and then the to-be-processed packet can be forwarded by using the software module of the network interface card node and the second flow table stored in the software module. Similarly, in order to implement the packet forwarding operation, the first server corresponding to the to-be-processed packet can be first determined based on the second flow table, so as to forward, based on the second flow table, the to-be-processed packet to the first server to perform the corresponding data processing operation.

Step S303: update the first server to a second server when a running state of the first server is an abnormal state, where a running state of the second server is a normal state.

During the data transmission process between the physical machine/the virtual machine and the server, running states of the server can include a normal state and an abnormal state. When a to-be-processed packet is obtained and it is determined that the server used to analyze and process the to-be-processed packet is in an abnormal state, it means that the server in the abnormal state cannot perform a normal processing operation on the to-be-processed packet. Therefore, in order to ensure the quality and efficiency of analyzing and processing the packet, after the first server corresponding to the to-be-processed packet is determined, the running state of the first server can be detected. In some instances, the detecting the running state of the first server can include: obtaining a state machine corresponding to the first server, and obtaining the running state of the first server through a state identifier in the state machine. For example, when the state identifier is “0”, it can be determined that the running state of the first server is an abnormal state; and when the state identifier is “1”, it can be determined that the running state of the first server is a normal state.

In other instances, the detecting the running state of the first server can include: sending a heartbeat packet to the first server; determining the running state of the first server based on whether a data packet corresponding to the heartbeat packet is received. For example, when the data packet corresponding to the heartbeat packet is received within a preset time period, it can be determined that the running state of the first server is a normal state; and when the data packet corresponding to the heartbeat packet is not received within the preset time period, it can be determined that the running state of the first server is an abnormal state.

When it is determined that the running state of the first server is an abnormal state, in order to ensure the quality and efficiency of analyzing and processing the packet, the first server needs to be updated to the second server. At this time, the determined running state of the second server is a normal state, so that the to-be-processed packet can be analyzed and processed by the second server in a normal state.

Step S304: edit the to-be-processed packet corresponding to the first server based on the second server, to obtain a processed packet, where the processed packet includes configuration information of the second server.

After the first server is updated to the second server, in order to analyze and process the to-be-processed packet by using the second server, the to-be-processed packet can be edited based on the second server to obtain the processed packet. In some instances, the editing the to-be-processed packet corresponding to the first server based on the second server to obtain the processed packet can include: obtaining the configuration information of the second server; adding the configuration information to a preset field of the to-be-processed packet, to obtain the processed packet.

Specifically, after the second server is obtained, the configuration information corresponding to the second server can be obtained. The configuration information can include: IP address information, port information, protocol information, and so on. After the configuration information of the second server is obtained, the configuration information can be added to a preset field of the to-be-processed packet corresponding to the first server, so as to obtain a processed packet, and the processed packet includes the configuration information of the second server.

It should be noted that when the packet processing method in the embodiments is specifically applied, there can be two implementation scenarios: (1) if it is determined that the first server corresponding to the to-be-processed packet is in an abnormal state, the current to-be-processed packet can be ignored/discarded, and the first server can be updated to the second server that is running normally, so that a subsequent to-be-processed packet corresponding to the first server can be edited by using the second server to obtain the processed packet, further to implement a normal data processing operation on the subsequent packet. In this case, the current to-be-processed packet is ignored; and (2) if it is determined that the first server corresponding to the to-be-processed packet is in an abnormal state, the first server can be updated to the second server that is running normally, and the to-be-processed packet (which may include: the current to-be-processed packet and/or the subsequent to-be-processed packet) corresponding to the first server can be edited based on the second server to obtain an edited packet, and then the edited packet can be analyzed and processed by the second server, so that a normal data processing operation is performed on the packet corresponding to the first server. In this case, the current to-be-processed packet can be selectively to be ignored.

It should be noted that the processed packet obtained through the editing of the to-be-processed packet is different from the to-be-processed packet, that is, the response server corresponding to the to-be-processed packet is the first server, while the response server corresponding to the processed packet is the second server. Specifically, during the process of analyzing and processing a packet, a to-be-processed packet can be obtained through a log file; similarly, after the to-be-processed packet is edited, the processed packet can be obtained through the log file. Then, through comparison, it can be determined that there is a difference between the to-be-processed packet and the processed packet, so that it can be determined that the editing operation on the to-be-processed packet is completed.

In the packet processing method provided in the embodiment, by obtaining the to-be-processed packet, determining the first server corresponding to the to-be-processed packet, updating the first server to the second server when the running state of the first server is the abnormal state, in which the running state of the second server is the normal state, and then editing the to-be-processed packet based on the second server to obtain the processed packet, following achievement is thus effectively achieved: when the first server used for packet processing is in an abnormal state, the first server can be quickly and promptly replaced with the second server in the normal state, so as to perform a corresponding processing operation on the to-be-processed packet by using the second server which is running normally. It can effectively avoid data processing performance loss in user stress testing and malicious attack scenarios, and in turn help improve the quality and stability of analyzing and processing the packet.

FIG. 4 is a schematic flowchart of another packet processing method provided by an embodiment of the present disclosure. With reference to FIG. 4, in order to further improve the practicality of the packet processing method, the method in the embodiment may also include:

- step S401: obtain a storage space corresponding to the hardware module, where the storage space includes at least one of: an on-chip cache corresponding to the hardware module, or an off-chip storage space corresponding to the hardware module; and
- step S402: store the first flow table in the storage space.

Since the hardware module includes a first flow table for fast forwarding processing of packets, in order to expand and add entries in the first flow table and improve the hit rate of the packets, a storage space can be configured for the hardware module. The storage space may include at least one of: an on-chip cache corresponding to the hardware module, or an off-chip storage space corresponding to the hardware module (for example, an off-chip double data rate synchronous dynamic random access memory, DDR). After the storage space is configured, the first flow table can be stored in the storage space. Since the memory space of the storage space is large, the first flow table can include more entries, which can greatly improve the probability of a packet hitting the first flow table and help to improve the quality and efficiency of packet forwarding.

As an example 1, the network interface card includes a hardware module composed of an FPGA and a software module composed of a CPU. The FPGA includes a first flow table for fast forwarding processing of packets, and the CPU includes a second flow table for forwarding processing of packets. The FPGA can be configured in an on-chip cache and an off-chip DDR. The storage space size of the off-chip DDR can be configured according to specific application requirements. In this case, the first flow table can be stored in the on-chip cache and/or the off-chip DDR. In this way, the first flow table can include more entries, which can greatly increase the probability of a packet hitting the first flow table and help to improve the quality and efficiency of forwarding packets.

As an example 2, unlike the above example 1, it is possible to configure only an off-chip DDR in the FPGA. In this case, the first flow table can be stored in the off-chip DDR, and the first flow table can also include more entries, which thus can greatly increase the probability of a packet hitting the first flow table and help to improve the quality and efficiency of forwarding packets.

In the embodiments, by obtaining the storage space corresponding to the hardware module and then storing the first flow table in the storage space, it is effectively realized that the first flow table can be stored in a large storage space, thus enabling the first flow table to include more entries. When a packet is analyzed and processed with the first flow table, the probability of the packet hitting the first flow table can be greatly increased, which helps to improve the performance and efficiency of forwarding and processing packets.

FIG. 5 is a schematic flowchart of yet another packet processing method provided by an embodiment of the present disclosure. With reference to FIG. 5, when the hardware module is configured with a storage space, the method in the embodiment may further include:

- step S501: obtain, through the storage space, first statistical information corresponding to the first flow table;
- step S502: obtain second statistical information corresponding to the second flow table; and
- step S503: update the second statistical information based on the first statistical information.

The hardware module of the network interface card includes the first flow table, and the software module of the network interface card includes the second flow table. For forwarding a packet by using the first flow table or the second flow table in the network interface card, flow table statistical information corresponding to the packet forwarding operation is generated to identify corresponding relevant information for the user to use a packet processing service. The above flow table statistical information can include statistical information of all flow table entries, for example, service statistical information (a number of uses, a frequency of use, a network bandwidth, a data processing speed, a service fee, etc.), flow statistical information (five-tuple information).

Specifically, when the first flow table in the hardware module is used for forwarding of the packet, the first statistical information corresponding to the first flow table can be generated, where the first statistical information can include at least one of: a flow table statistical table, a service statistical table, etc. The above-mentioned service statistical table can limit the network bandwidth used to implement the packet processing operation and the service fee is determined based on the limited network bandwidth. When the second flow table in the software module is used for forwarding of the packet, the second statistical information corresponding to the second flow table can be generated, and can include at least one of: a flow table statistical table, a service statistical table.

After the first statistical information corresponding to the first flow table and the second statistical information corresponding to the second flow table are generated, the first statistical information can be stored in a storage space corresponding to the hardware module. For example, the first statistical information is stored in an off-chip DDR, while the secondary statistical information is stored in a host memory of the software module. It should be noted that when a packet hits the first flow table in the hardware module, the forwarding processing can be performed by directly using the first flow table without a need to use the second flow table in the software module to process the packet. At this time, the first statistical information corresponding to the first flow table will be updated along with the forwarding processing operation on the packet, but the second statistical information stored in the host memory is not updated synchronously. Therefore, in order to achieve consistency between the flow table statistical information located in the host memory and the flow table statistical information located in the storage space, the first statistical information corresponding to the first flow table can be obtained through the storage space, and the second statistical information corresponding to the second flow table is also obtained. After the first statistical information and the second statistical information is obtained, the second statistical information can be updated based on the first statistical information, thereby effectively realizing a synchronization operation on the flow table statistical information within the host memory and the storage space.

In the embodiments, the first statistical information corresponding to the first flow table is obtained through the storage space, the second statistical information corresponding to the second flow table is obtained, and then the second statistical information is updated based on the first statistical information, so as to effectively realize a synchronization operation between the second statistical information in the host memory and the first statistical information in the storage space, which can further ensure the quality and efficiency of analyzing and processing the packets.

Figures 6, 7, 8:
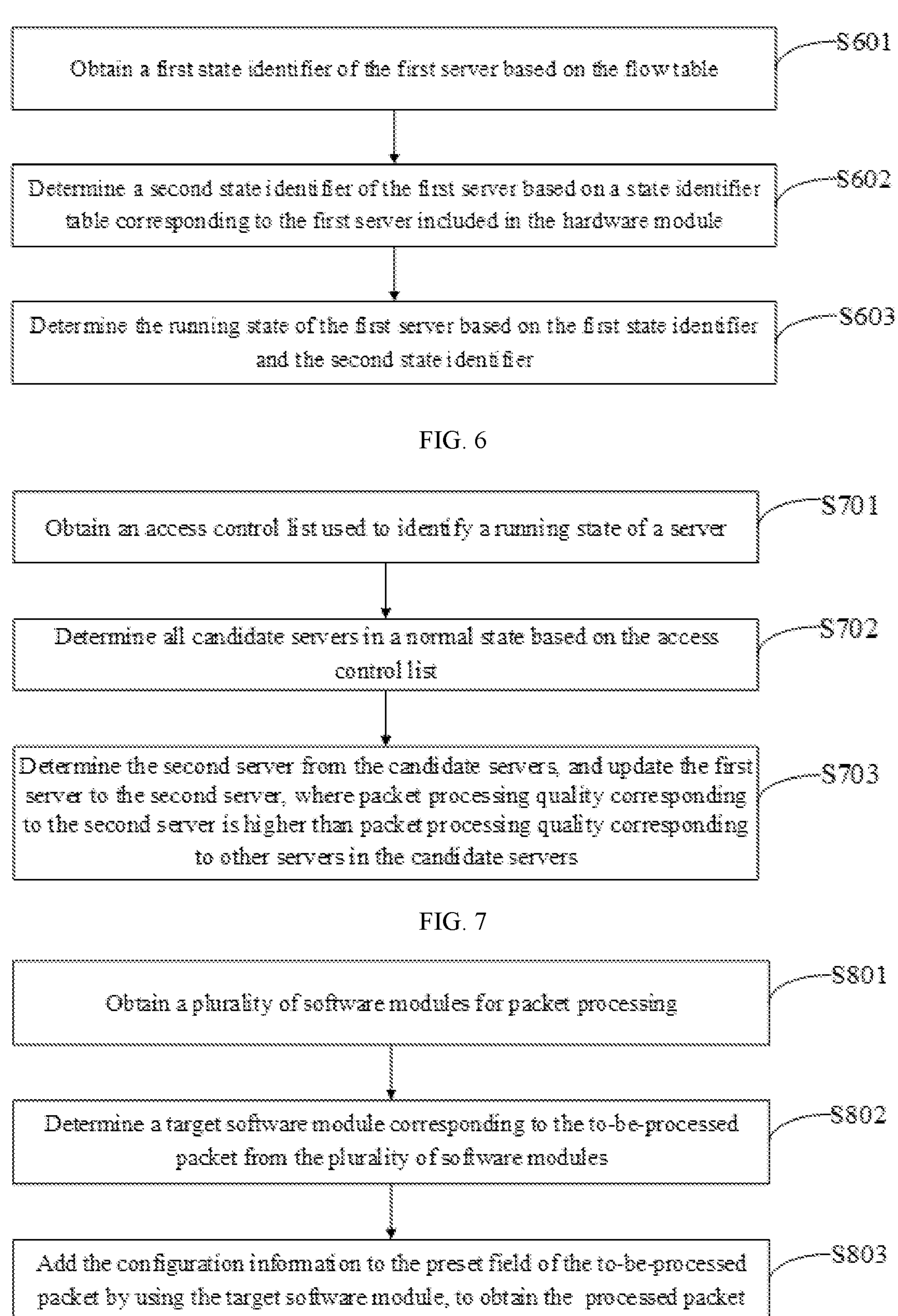
FIG. 6 is a schematic flowchart of another packet processing method provided by an embodiment of the present disclosure.
FIG. 7 is a schematic flowchart of yet another packet processing method provided by an embodiment of the present disclosure.
FIG. 8 is a schematic flowchart of adding configuration information to a preset field of a to-be-processed packet to obtain a processed packet according to an embodiment of the present disclosure.

FIG. 6 is a schematic flowchart of another packet processing method provided by an embodiment of the present disclosure. With reference to FIG. 6, after determining the first server corresponding to the to-be-processed packet, the method in the embodiment can further include:

- step S601: obtain a first state identifier of the first server based on the flow table;
- step S602: determine a second state identifier of the first server based on a state identifier table corresponding to the first server included in the hardware module; and
- step S603: determine the running state of the first server based on the first state identifier and the second state identifier.

After the first server corresponding to the to-be-processed packet is determined, in order to ensure the stability and reliability of data processing, the running state of the first server can be detected. Specifically, the first state identifier of the first server can be obtained based on the flow table. The first state identifier can include a version field of the flow table. In addition, the hardware module stores a state identifier table corresponding to the first server. The state identifier table may be a version table. In order to accurately obtain the running state of the first server, the second state identifier of the first server can be determined based on the state identifier table corresponding to the first server included in the hardware module. The second state identifier is the state identifier included in the version table in the hardware module.

After the first state identifier and the second state identifier are obtained, the first state identifier and the second state identifier can be analyzed to determine the running state of the first server. In some instances, the determining the running state of the first server based on the first state identifier and the second state identifier can include: determining that the running state of the first server is a normal state, when the first state identifier is consistent with the second state identifier; and determining that the running state of the first server is an abnormal state, when the first state identifier is inconsistent with the second state identifier.

Specifically, after the first state identifier and the second state identifier are obtained, the first state identifier and the second state identifier can be analyzed and compared. When the first state identifier and the second state identifier are consistent, the running state of the first server can be determined to be a normal state; and when the first state identifier and the second state identifier are inconsistent, the running state of the first server can be determined to be an abnormal state, thereby effectively realizing an accurate and reliable determination of the running state of the first server.

In other instances, before obtaining the state identifier table corresponding to the first server included in the hardware module, the method in the embodiment may further include: obtaining respective state query requests for all servers; determining respective current running states of all the servers based on the state query requests; synchronizing the respective current running states of all the servers to the hardware module, to generate state identifier tables, where the state identifier tables include state identifiers used to identify running states of all the servers.

In order to enable the hardware module to store state identifiers used to identify the running states of all the servers, the packet processing apparatus can perform data interaction operations with all the servers. Specifically, the packet processing apparatus can generate respective state query requests for all servers. With these state query requests, real-time or periodic detection of the running states of all the servers can be realized. In some instances, the state query request can be a heartbeat packet. After the state query requests are obtained, the state query requests can be sent to all the servers, respectively, and then the current running states of all the servers is determined based on whether feedback information corresponding to a data query request is received within a preset time period. Specifically, when feedback information corresponding to the data query request is received within the preset time period, the current running state of the server is determined to be a normal state; and when feedback information corresponding to the data query request is not received within the preset time period, the current running state of the server is determined to be an abnormal state, thereby effectively realizing the determination of the current running states of all the servers based on the state query requests.

When the current running states of all the servers are obtained, the current running states of all the servers can be synchronized to the hardware module to generate state identifier tables. The state identifier tables include state identifiers used to identify the running states of all the servers. In this way, it is effectively realized that the running state of the server can be obtained through regular detection, and then the running state of the server can be synchronized to the hardware module, which can effectively ensure the accuracy and reliability of determining the running state of the first server.

In the embodiment, the first state identifier of the first server is obtained based on the flow table, then the state identifier table corresponding to the first server included in the hardware module is obtained, the second state identifier of the first server is determined based on the state identifier table, and the running state of the first server is determined based on the first state identifier and the second state identifier, thereby effectively achieving stable and reliable determination of the running state of the first server and further improving the quality and efficiency of the packet editing operation.

FIG. 7 is a schematic flowchart of yet another packet processing method provided by an embodiment of the present disclosure. With reference to FIG. 7, when the first server is in an abnormal running state, in order to ensure the quality and efficiency of analyzing and processing packets, the second server can be first determined, and then the first server is updated to the second server. Specifically, the updating the first server to the second server may include:

step S701: obtain an access control list used to identify a running state of a server;

step S702: determine all candidate servers in a normal state based on the access control list; and step S703: determine the second server from the candidate servers, and update the first server to the second server, where packet processing quality corresponding to the second server is higher than packet processing quality corresponding to other servers in the candidate servers.

An access control list corresponding to all the servers are pre-configured. The access control list can identify the running states of all the servers. In order to accurately obtain the second server in a normal state, when the first server is in an abnormal state, the access control list used to identify the running state of the server can be obtained, and then all candidate servers in the normal state can be obtained based on the access control list. The candidate servers do not include the first server, and then a second server can be determined from the candidate servers, and the first server is updated to the second server.

In some instances, before determining all the candidate servers in the normal state based on the access control list, the method in the embodiment may further include: obtaining a server flow table corresponding to the first server based on the access control list; and deleting the server flow table based on the abnormal state of the first server, to obtain an updated access control list.

Since the first server is in an abnormal running state, before all candidate servers in a normal state are determined, in order to accurately determine the second server in a normal state, the server flow table corresponding to the first server can be obtained based on the access control list, and then the server flow table can be deleted based on the abnormal state of the first server, thereby effectively realizing that after an abnormality occurs to a server, the access control list ACL can be quickly updated. Specifically, the flow table corresponding to the server in the abnormal running state in the ACL can be deleted, so as to invalidate the server in the abnormal running state, and then an updated access control list can be obtained. The corresponding servers in the updated access control list are all in a normal state, which can effectively ensure the accuracy and reliability of the determination of the second server.

For example, the access control list corresponds to: a server 1, a server 2, a server 3, a server 4 and a server 5. The server 1 corresponds to a packet set a, the server 2 corresponds to a packet set b, the server 3 corresponds to a packet set c, the server 4 corresponds to a packet set d, and the server 5 corresponds to a packet set e.

After the to-be-processed packet is obtained and the first server corresponding to the to-be-processed packet is determined to be the server 5, the running state of the server 5 can be detected. When the running state of the server 5 is an abnormal state, the flow table corresponding to the server 5 in the access control list can be deleted, that is, "flow table entry corresponding to the server 5" is deleted, thereby enabling the server 5 in an abnormal state to be invalidated, so that the updated access control list can be obtained. The updated access control list corresponds to the server 1, the server 2, the server 3 and the server 4.

After the updated access control list is obtained, all candidate servers in the normal state can be determined. The candidate servers can include the server 1, the server 2, the server 3 and the server 4. The above candidate servers are all in the normal running state, and then the second server can be determined from the candidate servers. The second server can be any one of the server 1, the server 2, the server 3 and the server 4. For example, when the server 3 is determined as the second server, then the server 5 used for analyzing and processing the to-be-processed packet can be updated to the server 3, and then the to-be-processed packet can be analyzed and processed based on the server 3, thereby improving the quality and efficiency of analyzing and processing the to-be-processed packet.

In some instances, the determining the second server from the candidate servers may include: obtaining a data processing resource and a data processing duration corresponding to each candidate server; determining, based on the data processing resource and the data processing duration corresponding to the each candidate server, packet processing quality corresponding to the each candidate server; and determining the second server based on the packet processing quality corresponding to the each candidate server. The packet processing quality corresponding to the second server is higher than packet processing quality corresponding to other servers in the candidate servers.

Specifically, a first weight corresponding to the data processing resource and a second weight corresponding to the data processing duration are determined, and the data processing resource and the data processing duration are weighted and then summed based on the first weight and the second weight, to obtain packet processing quality corresponding to the each candidate server. It can be understood that the packet processing quality is positively correlated with the data processing resource, and is negatively correlated with the data processing duration. After the packet processing quality corresponding to the each candidate server is obtained, the packet processing quality corresponding to the each candidate server can be analyzed and compared, and then the candidate server with the highest data processing quality among the candidate servers is determined as the second server, thereby effectively ensuring the accuracy and reliability of determining the second server, and further improving the quality and efficiency of analyzing and processing packets based on the second server. In the embodiments, the access control list used to identify the running state of the server is obtained, then all candidate servers in the normal state are determined based on the access control list, the second server is determined from the candidate servers, and the first server is updated to the second server, thus effectively realizing that the abnormally running server used for analyzing and processing packets can be updated to a server that is running normally, thereby ensuring the quality and efficiency of analyzing and processing packets.

FIG. 8 is a schematic flowchart of adding configuration information to a preset field of a to-be-processed packet to obtain a processed packet according to an embodiment of the present disclosure. Referring to FIG. 8, the embodiment provides an implementation for obtaining the processed packet. Specifically, in the embodiment, the adding the configuration information to the preset field of the to-be-processed packet to obtain the processed packet may include:

step S801: obtain a plurality of software modules for packet processing;

step S802: determine a target software module corresponding to the to-be-processed packet from the plurality of software modules; and step S803: add the configuration information to the preset field of the to-be-processed packet by using the target software module, to obtain the processed packet.

There are a plurality of software modules for analyzing and processing packets in the packet processing apparatus.

In order to ensure the quality and efficiency of analyzing and processing packets, after the to-be-processed packet is obtained, the plurality of software modules for packet processing can be first obtained, the target software module corresponding to the to-be-processed packet can then be determined from the plurality of software modules. In some instances, the determining the target software module corresponding to the to-be-processed packet from the plurality of software modules may include: obtaining, for each of the plurality of software modules, a data load corresponding to a respective software module, and determining the target software module corresponding to the to-be-processed packet from the plurality of software modules based on the data load. Specifically, the software module with a small data load can be determined as the target software module corresponding to the to-be-processed packet. In other instances, the determining the target software module corresponding to the to-be-processed packet from the plurality of software modules may include: obtaining, for each of the plurality of software modules, data processing performance (which can be reflected by a data processing rate) corresponding to a respective software module, and determining the target software module corresponding to the to-be-processed packet from the plurality of software modules based on the data processing performance. Specifically, the software module with a high data processing performance can be determined as the target software module corresponding to the to-be-processed packet. In still other instances, the determining the target software module corresponding to the to-be-processed packet from the plurality of software modules may include: obtaining the polling order corresponding to the plurality of software modules, and determining the target software module corresponding to the to-be-processed packet from the plurality of software modules based on the polling order.

It can be understood that the way of determining the target software module is not limited to the above implementations. Those skilled in the art can also use other implementations to determine the target software module corresponding to the to-be-processed packet from the plurality of software modules, as long as the accuracy and reliability of determining the target software module can be ensured, which will not be repeated here.

After the target software module is obtained, the configuration information can be added to the preset field of the to-be-processed packet by using the target software module, so as to obtain the processed packet, and the processed packet can include the configuration information of the second server. It effectively ensures the accuracy and reliability of obtaining the processed packet.

In further some instances, after obtaining the processed packet, the method in the embodiment may further include: forwarding the processed packet to the second server by using the target software module, so that the second server renders a response to the processed packet.

Specifically, after the target software module is obtained, the processed packet can be forward to the second server by using the target software module, so that the second server can render a response to the processed packet, thereby effectively ensuring the quality and efficiency of analyzing and processing the packet.

In the embodiment, by obtaining a plurality of software modules for packet processing, then determining a target software module corresponding to the to-be-processed packet from the plurality of software modules, and adding the configuration information to the preset field of the to-be-processed packet by using the target software module to obtain the processed packet, thereby effectively ensuring the load balancing corresponding to the software module, and further improving the quality and efficiency of analyzing and processing the packet.

Figure 9:
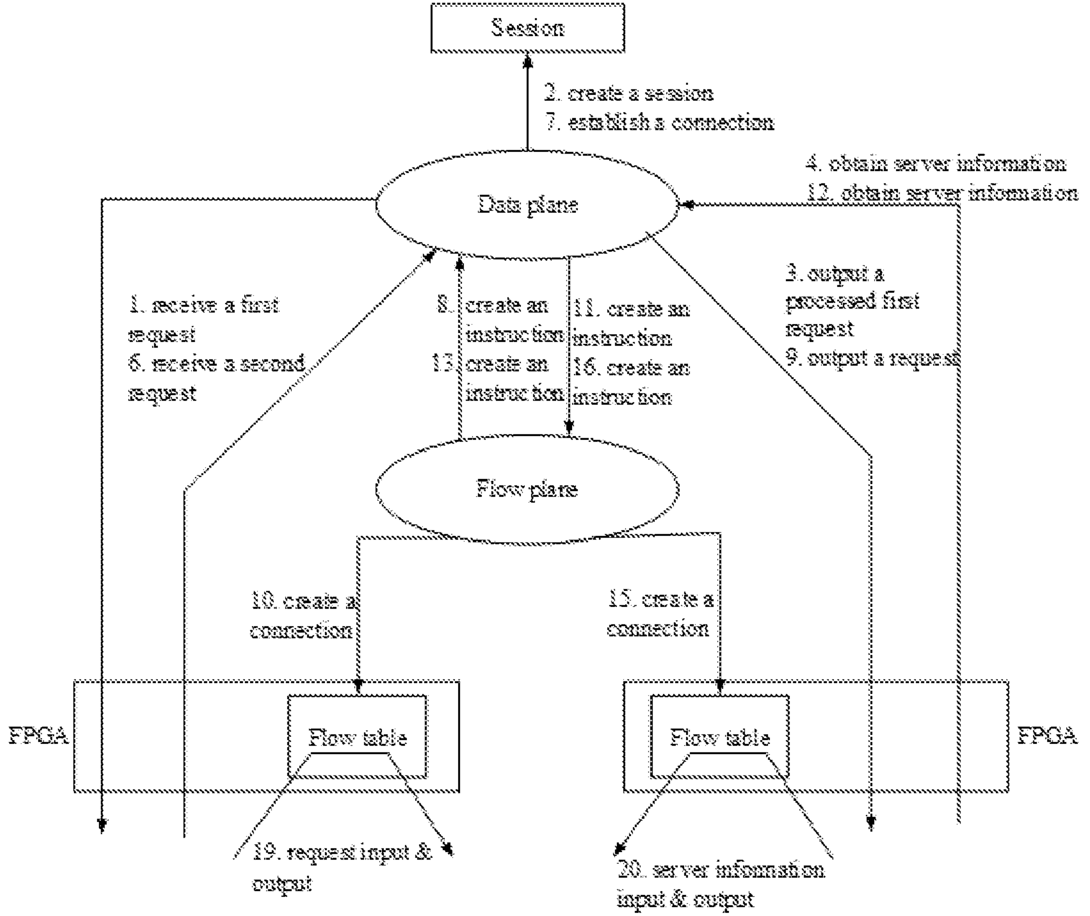
FIG. 9 is a schematic diagram of a connection establishment in a packet processing method provided by an application embodiment of the present disclosure.

In a specific application, the application embodiment provides a packet processing method based on software and hardware integration. An execution body of the packet processing method can be a load balancing apparatus. The load balancing apparatus can implement as a network interface card structure. The network interface card structure renders no change in an external configuration interface, and thus can meet the personalized needs of users, and can support the data backfilling operation of each flow, ensuring the normal operation of packet processing. In addition, the load balancing apparatus is used to realize the packet transmission operation between the client and the server. The load balancing apparatus can include: multiple software modules (CPU) and a hardware module used to provide network interface card and data flow offloading capabilities. The hardware module can be composed of FPGA, the hardware module can include a first flow table, which is used for analysis and processing of packets of long connections; and the software module is used for load balancing slow-turning logic (scheduling connections, creating new connections, and destroying connections, etc.). Specifically, in order to enable the analysis and processing of packets, it is necessary to ensure that a communication connection is established between the client and the server. As shown in FIG. 9, a communication connection can be established between the client and the server through a three-way handshake. Specifically, the following steps can be included.

Step 1: the client sends a first request for establishing a communication connection with the server to the load balancing apparatus.

Step 2: the first request can be sent to a data plane in the load balancing apparatus through the FPGA.

After the data plane receives the first request, a session corresponding to the client and the server can be established based on the first request.

Step 3: the data plane analyzes and processes the first request, determines the processed first request, and sends the processed first request to the corresponding server.

Step 4: server information is obtained based on the processed first request, and the server information is returned to the client.

Step 6: the client generates a second request for establishing a communication connection with the server based on the server information, and sends the second request to the data plane in the load balancing apparatus.

Step 7: the second request can be sent through the FPGA to the data plane in the load balancing apparatus.

The data plane is mainly used to handle asynchronous cross-core packet generation for connection creation, packet forwarding, and FPGA offloading. At this time, after the data plane receives the second request, a session corresponding to the client and the server can be established based on the second request. Through the above steps 1 to 7, a session for realizing a communication connection is effectively established between the client and the server, and then a normal communication connection can be established between the client and the server.

Step 9: after obtaining the second request, the data plane can analyze and process the second request, determine the processed second request, and send the processed second request to the corresponding server. At this time, the client establishes a communication connection with the server.

Steps 10-20: after obtaining the second request, the data plane can send a flow creation instruction to a flow plane to create a data flow corresponding to the client at the flow plane, and can send the data flow to the FPGA for analysis and processing.

The flow plane is used to receive flow creation instructions/flow deletion instructions sent by the data plane, and is responsible for delivering/deleting the corresponding data flow for the FPGA, which can effectively shield the delay of data exchanges between the load balancing apparatus and the FPGA. In addition, the data plane can create a flow table for analysis and processing of the data flow. At this time, the created flow table can be synchronized between the flow plane and the FPGA. After the flow table created by the FPGA takes effect, if the to-be-processed packet hits the flow table in the FPGA, the packet does not need to be sent to the CPU for analysis and processing. It not only effectively enables normal data communication between the client and the server, but also triggers the unloading operation of the data flow only after the connection between the client and the server is fully established, thereby ensuring the quality and efficiency of analyzing and processing data.

In addition, after the client establishes a communication connection with the server through the load balancing system, the packet processing system at this time can analyze and process the packets. The above load balancing system includes a host memory, and the host memory stores flow statistical information and service statistical information. At this time, the packet processing method may include the following steps.

Step 11: obtain a to-be-processed packet.

Step 12: check whether the to-be-processed packet hits a flow table in the FPGA.

Step 13: forward, by using the flow table, the to-be-processed packet to the corresponding first server for analysis and processing, when the to-be-processed packet hits the flow table in the FPGA; and forward, by using a flow table in the software module, the to-be-processed packet to the corresponding first server for analysis and processing, when the to-be-processed packet does not hit the flow table in the FPGA.

It should be noted that the number of software modules used to analyze and process the to-be-processed packet can be more than one. In order to improve the quality and efficiency of analyzing and processing the to-be-processed packet, a target software module for analyzing and processing the to-be-processed packet can be determined from a plurality of software modules. Specifically, a load balancing algorithm can be used to determine a target software module for analyzing and processing the to-be-processed packet from the plurality of software modules.

Step 14: detect the running state of the first server.

The detecting the running state of the first server may include: obtaining a first version field of the first server based on the flow table; obtaining a version table corresponding to the first server included in the hardware module; determining a second version field of the first server based on the version table; determining the running state of the first server based on the first version field and the second version field; when the first version field and the second version field are consistent, determining the running state of the first server to be a normal state; and when the first version field and the second version field are inconsistent, determining the running state of the first server to be an abnormal state.

Before obtaining the second state identifier of the first server based on the hardware module, the method in the embodiment may also include: the SLB system may periodically obtain respective state query requests for all servers, and then send the respective state query requests to all the servers, to determine the current running states of all the servers based on the state query requests, and then can synchronize the current running states of all the servers to the hardware module to generate a version table. The version table includes a state identifier used to identify a running state of a server.

Step 15: when the first server corresponding to the to-be-processed packet is in an abnormal state, in order to ensure the quality and efficiency of analyzing and processing the to-be-processed packet, the second server in the normal state can be determined, and then the first server corresponding to the to-be-processed packet can be updated to the second server.

Specifically, after it is determined that the first server corresponding to the to-be-processed packet is in an abnormal state, the method in the embodiment may further include: obtaining a server flow table corresponding to the first server based on an access control list; and deleting the server flow table based on the abnormal state of the first server, to obtain an updated access control list.

After the updated access control list is obtained, all candidate servers in a normal state can be determined based on the access control list; and a second server is determined from the candidate servers, and the first server is updated to the second server. Specifically, the configuration information corresponding to the second server can be obtained, and then the configuration information is added to the preset field of the to-be-processed packet, so as to obtain the processed packet.

Step 16: send the to-be-processed packet to the second server, so that the second server can perform a corresponding processing operation on the to-be-processed packet.

Through the above implementation process, it is effectively realized that analysis and processing of packet is implemented by using the combination of software and hardware, and when the server used to analyze and process packets runs abnormally, the server can be changed to a server that runs normally. The quality and efficiency of packet processing are thus guaranteed.

In addition, during processing the to-be-processed packet based on the second server, in order to improve the packet hit rate, the FPGA in the embodiment can be configured with an off-chip DDR. Specifically, the method in the embodiment can also include the following.

Step 100: obtain a storage space corresponding to the hardware module (i.e., an off-chip DDR).

Step 101: store the first flow table of the FPGA in the above storage space.

The first flow table used for analysis and processing of the packet can be stored on the off-chip DDR. The specifications of the first flow table can support any of: a single card 64M flow table, a single machine 256M flow table, etc., which can be set based on specific application scenarios or application requirements.

In addition, in order to improve the quality and efficiency of the packet processing, after the first flow table for analysis and processing of the packet, the first flow table can be compressed, to obtain a compressed flow table. Specifically, compression processing can be implemented through an indirect table or an index, or can be implemented based on field multiplexing. Specifically, a packet flow type can be determined, and the multiplexing field can be determined based on the packet flow type. The flow table is compressed based on the packet flow type and the multiplexing field.

Step 102: during the process of analyzing and processing the packet, the first statistical information corresponding to the first flow table may be stored in the above storage space.

Specifically, with reference to FIG. 10, the first flow table information may include: service statistical information and flow statistical information (five-tuple information). A charging operation corresponding to the packet processing service can be implemented with the service statistical information. For example, when User A uses a packet processing service with a network bandwidth of D1 to perform a data processing operation, it can be determined, based on the service statistical information and the flow statistical information corresponding to the above data processing operation, that User A needs to pay a corresponding fee of M1 for the packet processing service; and when User B uses a packet processing service with a network bandwidth of D2 to perform a data processing operation, it can be determined, based on the service statistical information and the flow statistical information corresponding to the above data processing operation, that User B needs to pay the corresponding fee of M2 for the packet processing service.

Step 103: obtain the second statistical information corresponding to the second flow table in the host memory.

Step 104: synchronously update the second statistical information based on the first statistical information.

It should be noted that the hardware module in the above embodiments can use a P4 programmable switching chip to replace the FPGA to achieve software and hardware integration. From the perspective of functional flexibility, the programmability of both the P4 programmable switching chip and the FPGA can satisfy various feature support and protocol support after offloading of the SLB system; and from the size perspective of the flow table entries, since the FPGA can be added with a DDR storage, hundreds of millions of flow offloading operations of the SLB system can be met.

The packet processing method provided by the application embodiment realizes the analysis and processing of the packet by combining software and hardware. Since the hardware module in the packet processing system can be configured with a storage space, such as an off-chip DDR, and the flow table for analysis and processing of the packet can be stored in the above configured storage space, thus the flow table can support larger-scale entries, which not only greatly improves the forwarding capability of the system, but also avoids service loss occurring in user stress testing and malicious attack scenarios. It is beneficial to improve product stability. In addition, the technical solution in the embodiment can ensure that the externally exposed control plane interface remains unchanged, which facilitates smooth and rigorous architecture, and can also enable the flow table offloaded to the hardware to support the existing features of the load balancing system, further improving the practicality of the packet processing method and being conducive to market promotion and application.

FIG. 11 is a schematic flowchart of yet another packet processing method provided by an embodiment of the present disclosure. With reference to FIG. 11, the embodiment provides yet another packet processing method, and the execution body of this method is a packet processing apparatus. It can be understood that the packet processing apparatus can be implemented as software, or a combination of software and hardware. During a specific implementation, the packet processing apparatus can be implemented as a network interface card node. Specifically, the packet processing method may include:

step S1101: determine, in response to invoking a packet processing request, a processing resource corresponding to a packet processing service; and step S1102: perform following steps by using the processing resource: obtaining a to-be-processed packet; determining a first server corresponding to the to-be-processed packet;

updating the first server to a second server when a running state of the first server is an abnormal state, where a running state of the second server is a normal state; editing the to-be-processed packet corresponding to the first server based on the second server, to obtain a processed packet, where the processed packet includes configuration information of the second server.

Specifically, the packet processing method provided by the present disclosure can be executed in the cloud. Several computing nodes can be deployed in the cloud, and each computing node has processing resources for computing, storage, etc. In the cloud, multiple computing nodes can be organized to provide certain services. Of course, one computing node can also provide one or more services.

For the solution provided by the present disclosure, the cloud can provide a service for completing the packet processing method, which is called as a packet processing service. When the user needs to use the packet processing service, the packet processing service is called to trigger a request to the cloud to call the packet processing service. The request can carry a to-be-processed packet. The cloud determines the computing node that responds to the request, and uses a processing resource in the computing node to perform the following steps: obtaining the to-be-processed packet; determining a first server corresponding to the to-be-processed packet; updating the first server to a second server when a running state of the first server is an abnormal state, where a running state of the second server is a normal state; and editing the to-be-processed packet corresponding to the first server based on the second server, to obtain a processed packet, where the processed packet includes configuration information of the second server.

Specifically, the implementation process, the implementation principles, and the implementation effects of the above method steps in this embodiment are similar to the implementation process, the implementation principles, and the implementation effects of the foregoing method steps in the embodiments shown in FIGS. 2 to 10. For detailed description that this embodiment does not give, please refer to the relevant description of the embodiments shown in FIGS. 2 to 10.

Figure 12:
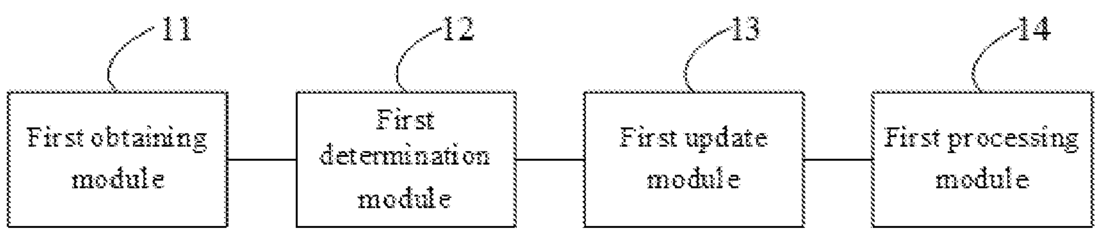
FIG. 12 is a schematic structural diagram of a packet processing apparatus provided by an embodiment of the present disclosure.

FIG. 12 is a schematic structural diagram of a packet processing apparatus provided by an embodiment of the present disclosure. With reference to FIG. 12, the embodiment provides a packet processing apparatus, which can execute the above packet processing method shown in FIG. 2. The packet processing apparatus may include:

a first obtaining module 11, configured to obtain a to-be-processed packet;

a first determination module 12, configured to determine a first server corresponding to the to-be-processed packet;

a first update module 13, configured to update the first server to a second server when a running state of the first server is an abnormal state, where a running state of the second server is a normal state; and a first processing module 14, configured to edit the to-be-processed packet corresponding to the first server based on the second server, to obtain a processed packet, where the processed packet includes configuration information of the second server.

In some instances, when the first determination module 12 determines the first server corresponding to the to-be-processed packet, the first determination module 12 is configured to: obtain a flow table for analysis and processing of the to-be-processed packet; and determine the first server corresponding to the to-be-processed packet based on the flow table.

In some instances, the flow table includes at least one of: a first flow table located in a hardware module or a second flow table located in a software module. When the first determination module 12 determines the first server corresponding to the to-be-processed packet based on the flow table, the first determination module 12 is configured to: determine the first server corresponding to the to-be-processed packet based on the first flow table, when the to-be-processed packet hits the first flow table; determine the first server corresponding to the to-be-processed packet based on the second flow table, when the to-be-processed packet does not hit the first flow table.

In some instances, the first obtaining module 11 and the first processing module 14 in the embodiment are used to perform the following steps.

The first obtaining module 11 is configured to obtain a storage space corresponding to the hardware module, where the storage space includes at least one of: an on-chip cache corresponding to the hardware module, or an off-chip storage space corresponding to the hardware module.

The first processing module 14 is configured to store the first flow table in the storage space.

In some instances, the first obtaining module 11 and the first update module 13 in the embodiment are configured to perform the following steps.

The first obtaining module 11 is configured to obtain, through the storage space, first statistical information corresponding to the first flow table.

The first obtaining module 11 is further configured to obtain second statistical information corresponding to the second flow table.

The first update module 13 is further configured to update the second statistical information based on the first statistical information.

In some instances, after the first server corresponding to the to-be-processed packet is determined, the first obtaining module 11, the first determination module 12 and the first processing module 14 in the embodiment are configured to perform the following steps. The first obtaining module 11 is configured to obtain a first state identifier of the first server based on the flow table.

The first determination module 12 is further configured to determine a second state identifier of the first server based on a state identifier table corresponding to the first server included in the hardware module.

The first processing module 14 is further configured to determine the running state of the first server based on the first state identifier and the second state identifier.

In some instances, before the state identifier table corresponding to the first server included in the hardware module is obtained, the first obtaining module 11, the first determination module 12 and the first processing module 14 in the embodiment are configured to perform the following steps.

The first obtaining module 11 is configured to obtain respective state query requests for all servers.

The first determination module 12 is configured to determine respective current running states of all the servers based on the state query requests.

The first processing module 14 is configured to synchronize the respective current running states of all the servers to the hardware module, to generate state identifier tables, where the state identifier table includes a state identifier used to identify the running state of the server.

In some instances, when the first processing module 14 determines the running state of the first server based on the first state identifier and the second state identifier, the first processing module 14 is configured to: determine that the running state of the first server is a normal state, when the first state identifier is consistent with the second state identifier; and determine that the running state of the first server is an abnormal state, when the first state identifier is inconsistent with the second state identifier.

In some instances, when the first update module 13 updates the first server to the second server, the first update module 13 is configured to: obtain an access control list used to identify a running state of a server; determine all candidate servers in a normal state based on the access control list; determine the second server from the candidate servers, and update the first server to the second server, where packet processing quality corresponding to the second server is higher than packet processing quality corresponding to other servers in the candidate servers.

In some instances, before all the candidate servers in the normal state are determined based on the access control list, the first obtaining module 11 and the first processing module 14 in the embodiment are configured to perform the following steps.

The first obtaining module 11 is configured to obtain a server flow table corresponding to the first server based on the access control list.

The first processing module 14 is configured to delete the server flow table based on the abnormal state of the first server, to obtain an updated access control list.

In some instances, when the first processing module 14 edits the to-be-processed packet corresponding to the first server based on the second server to obtain the processed packet, the first processing module 14 is configured to: obtain the configuration information of the second server; and add the configuration information to a preset field of the to-be-processed packet, to obtain the processed packet.

In some instances, when the first processing module 14 adds the configuration information to the preset field of the to-be-processed packet to obtain the processed packet, the first processing module 14 is configured to: obtain a plurality of software modules for packet processing; determine a target software module corresponding to the to-be-processed packet from the plurality of software modules; add the configuration information to the preset field of the to-be-processed packet by using the target software module, to obtain the processed packet.

In some instances, after the processed packet is obtained, the first processing module 14 in the embodiment is configured to: forward the processed packet to the second server by using the target software module, so that the second server renders a response to the processed packet.

The apparatus shown in FIG. 12 can perform the method of the embodiments shown in FIGS. 2 to 10. For parts not described in detail in this embodiment, please refer to the relevant description of the embodiments shown in FIGS. 2 to 10. For the execution process and the technical effects of this technical solution, please refer to the description in the embodiments shown in FIGS. 2 to 10, which will not be repeated here.

Figure 13:
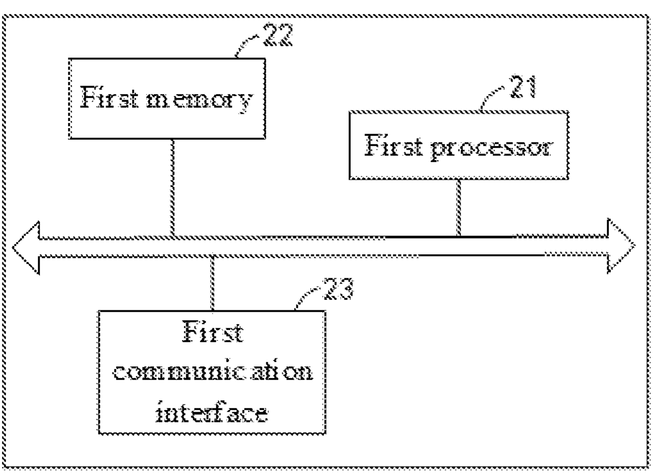
FIG. 13 is a schematic structural diagram of an electronic device corresponding to the packet processing apparatus provided by the embodiment shown in FIG. 12.

In a possible design, the structure of the packet processing apparatus shown in FIG. 12 can be implemented as an electronic device, and the electronic device can be a network interface card structure, a server, and other various devices. As shown in FIG. 13, the electronic device may include: a first processor 21 and a first memory 22. The first memory 22 is used to store a program corresponding to the electronic device executing the packet processing methods provided in the embodiments shown in FIGS. 2-10, and the first processor 21 is configured to execute the program stored in the first memory 22.

The program includes one or more computer instructions. When the one or more computer instructions are executed by the first processor 21, the following steps can be implemented: obtaining a to-be-processed packet; determining a first server corresponding to the to-be-processed packet; updating the first server to a second server when a running state of the first server is an abnormal state, where a running state of the second server is a normal state; editing the to-be-processed packet corresponding to the first server based on the second server, to obtain a processed packet, where the processed packet includes configuration information of the second server.

Further, the first processor 21 is further used to execute all or part of the steps in the aforementioned embodiments shown in FIGS. 2 to 10.

The structure of the electronic device may further include a first communication interface 23 for the electronic device to communicate with other devices or communication networks.

In addition, an embodiment of the present disclosure provides a computer storage medium for storing computer software instructions used by an electronic device, which includes a program for executing the packet processing methods in the method embodiments shown in FIGS. 2 to 10.

In addition, an embodiment of the present disclosure provides a computer program product, including: a computer-readable storage medium storing computer instructions. The computer instructions, when executed by one or more processors, enable the one or more processors to execute the steps of the packet processing method in the above method embodiments shown in FIGS. 2-10.

Figure 14:
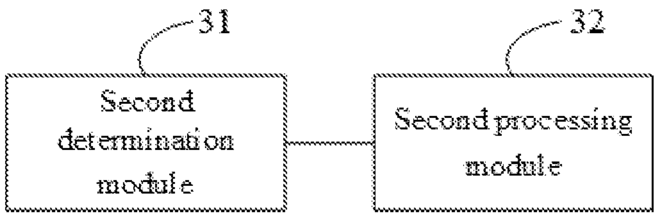
FIG. 14 is a schematic structural diagram of yet another packet processing apparatus provided by an embodiment of the present disclosure.

FIG. 14 is a schematic structural diagram of another packet processing apparatus provided by an embodiment of the present disclosure. With reference to FIG. 14, the embodiment provides another packet processing apparatus, which is used to execute the above packet processing method shown in FIG. 11. Specifically, the packet processing apparatus may include:

- a second determination module 31, configured to determine, in response to invoking a packet processing request, a processing resource corresponding to a packet processing service; and
- a second processing module 32, configured to perform following steps by using the processing resource: obtaining a to-be-processed packet; determining a first server corresponding to the to-be-processed packet; updating the first server to a second server when a running state of the first server is an abnormal state, where a running state of the second server is a normal state; and editing the to-be-processed packet corresponding to the first server based on the second server, to obtain a processed packet, where the processed packet includes configuration information of the second server.

The apparatus shown in FIG. 14 can perform the method of the embodiment shown in FIG. 11. For parts that are not described in detail in this embodiment, reference can be made to the relevant description of the embodiment shown in FIG. 11. For the implementation process and the technical effects of this technical solution, please refer to the description in the embodiment shown in FIG. 11, which will not be repeated here.

Figure 15:
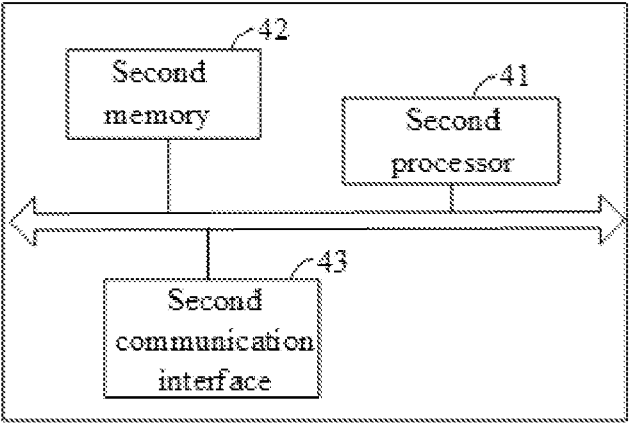
FIG. 15 is a schematic structural diagram of an electronic device corresponding to the packet processing apparatus provided by the embodiment shown in FIG. 14.

In a possible design, the structure of the packet processing apparatus shown in FIG. 14 can be implemented as an electronic device, and the electronic device can be a network interface card structure, a server, and other various devices. As shown in FIG. 15, the electronic device may include: a second processor 41 and a second memory 42. The second memory 42 is used to store a program corresponding to the electronic device executing the packet processing method provided in the embodiment shown in FIG. 11, and the second processor 41 is used to execute the program stored in the second memory 42.

The program includes one or more computer instructions, where when the one or more computer instructions are executed by the second processor 41, the following steps can be implemented:

- determining, in response to invoking a packet processing request, a processing resource corresponding to a packet processing service; and
- performing following steps by using the processing resource: obtaining a to-be-processed packet; determining a first server corresponding to the to-be-processed packet; updating the first server to a second server when a running state of the first server is an abnormal state, where a running state of the second server is a normal state; and editing the to-be-processed packet corresponding to the first server based on the second server, to obtain a processed packet, where the processed packet includes configuration information of the second server.

Further, the second processor 41 is further used to execute all or part of the steps in the aforementioned embodiment shown in FIG. 11.

The structure of the electronic device may also include a second communication interface 43 for the electronic device to communicate with other devices or communication networks.

In addition, an embodiment of the present disclosure provides a computer storage medium for storing computer software instructions used in an electronic device, which includes a program for executing the packet processing method in the above method embodiment shown in FIG. 11.

In addition, an embodiment of the present disclosure provides a computer program product, including: a computer-readable storage medium storing computer instructions. The computer instructions, when executed by one or more processors, cause the one or more processors to execute the steps of the packet processing method in the above method embodiment shown in FIG. 11.

The apparatus embodiments described above are only illustrative. The units thereof described as separate components may or may not be physically separated. The components shown as units may or may not be physical units, that is, they may be located in one place, or may be distributed to multiple network units. Some or all of the modules thereof can be selected according to actual needs to achieve the purpose of the solution of the embodiment. Persons of ordinary skill in the art can understand and implement them without any creative effort.

From the above description of the embodiments, those skilled in the art can clearly understand that each implementation can be implemented by adding the necessary general hardware platform, or of course, can also be implemented by combining hardware and software. Based on this understanding, the above technical solution in nature or the part thereof that contributes to the prior art can be embodied in the form of a computer product. The present disclosure can use the form of a computer program product implemented in one or more computer-usable storage media (including but not limited to disk storage, CD-ROM, optical storage, etc.) containing computer-usable program codes.

The present disclosure is described with reference to flowcharts and/or block diagrams of methods, apparatuses (systems), and computer program products according to embodiments of the invention. It will be understood that each process and/or block in the flowcharts and/or block diagrams, and combinations of processes and/or blocks in the flowcharts and/or block diagrams, can be implemented by computer program instructions. These computer program instructions may be provided to a processor of a general purpose computer, a special purpose computer, an embedded processor, or other programmable devices to produce a machine, such that the instructions executed by the processor of the computer or other programmable devices produce an apparatus for implementing the functionality specified in a process or processes of a flow diagram and/or a block or blocks of a block diagram.

These computer program instructions may also be stored in a computer-readable memory that causes a computer or other programmable devices to operate in a particular manner, such that the instructions stored in the computer-readable memory produce an article of manufacture that includes instruction means that performs the functionality specified in a process or processes in a flow diagram and/or in a block or blocks in a block diagram.

These computer program instructions may also be loaded into a computer or other programmable devices, such that a series of operational steps are performed in the computer or other programmable devices to produce a computer-implemented process, so that the instructions executed in the computer or other programmable devices provide the steps used to implement the functionality specified in a process or processes in a flow diagram and/or in a block or blocks in a block diagram.

In a typical configuration, a computing device includes one or more processors (CPU), an input/output interface, a network interface, and a memory. The memory may include a non-permanent storage in a computer-readable medium, a random access memory (RAM), and/or a non-volatile memory and other forms of memories, such as a read-only memory (ROM) or a flash memory (flash RAM). The memory is an example of a computer-readable medium.

The computer-readable medium includes both permanent and non-permanent, removable and non-removable media that can be implemented by any method or technology for storage of information. Information may be computer-readable instructions, data structures, modules of programs, or other data. Examples of the computer storage medium include, but are not limited to, a phase change memory (PRAM), a static random access memory (SRAM), a dynamic random access memory (DRAM), other types of random access memories (RAM), and a read-only memory (ROM), an electrically erasable programmable read-only memory (EEPROM), a flash memory or other memory technology, a compact disc read-only memory (CD-ROM), a digital versatile disc (DVD) or other optical storage, a magnetic tape cassette, a tape magnetic disk storage or other magnetic storage devices or any other non-transmission medium that can be used to store information that can be accessed by a computing device. As defined herein, the computer-readable medium does not include transitory computer readable media (transitory media), such as modulated data signals and carrier waves.

Finally, it should be noted that the above embodiments are only used to illustrate the technical solution of the present disclosure, but not to limit it; although the present disclosure has been described in detail with reference to the foregoing embodiments, those of ordinary skill in the art should understand that modifications can still be made to the technical solutions described in the foregoing embodiments, or equivalent substitutions can still be made to some of the technical features; however, these modifications or substitutions do not cause the essence of the corresponding technical solution to deviate from the spirit and scope of the technical solutions of the embodiments of the present disclosure.

The invention claimed is:

1. A packet processing method, comprising:

obtaining a packet;

determining a first server corresponding to the packet, wherein the first server is used to perform a data processing operation on the packet;

updating the first server to a second server when a running state of the first server is an abnormal state, wherein a running state of the second server is a normal state; and editing the packet corresponding to the first server based on the second server, to obtain a processed packet, wherein the processed packet comprises configuration information of the second server, wherein the determining the first server corresponding to the packet comprises:

obtaining a flow table for the packet, wherein the flow table comprises at least one of: a first flow table located in a hardware module or a second flow table located in a software module;

determining the first server corresponding to the packet based on the first flow table, when the packet hits the first flow table; and determining the first server corresponding to the packet based on the second flow table, when the packet does not hit the first flow table.

2. The method according to claim 1, further comprising:

obtaining a storage space corresponding to the hardware module, wherein the storage space comprises at least one of: an on-chip cache corresponding to the hardware module, or an off-chip storage space corresponding to the hardware module; and storing the first flow table in the storage space.

3. The method according to claim 2, further comprising:

obtaining, through the storage space, first statistical information corresponding to the first flow table, wherein the first statistical information comprises at least one of a flow table statistical table or a service statistical table and is stored in the storage space corresponding to the hardware module;

obtaining second statistical information corresponding to the second flow table, wherein the second statistical information comprises at least one of a flow table statistical table or a service statistical table and is stored in a host memory of the software module; and synchronizing the second statistical information with the first statistical information by updating the second statistical information based on the first statistical information.

4. The method according to claim 1, wherein after determining the first server corresponding to the packet, the method further comprises:

obtaining a first state identifier of the first server based on the flow table;

determining a second state identifier of the first server based on a state identifier table corresponding to the first server comprised in the hardware module;

determining that the running state of the first server is a normal state, when the first state identifier is consistent with the second state identifier; and determining that the running state of the first server is an abnormal state, when the first state identifier is inconsistent with the second state identifier.

5. The method according to claim 4, wherein before obtaining the state identifier table corresponding to the first server comprised in the hardware module, the method comprises:

obtaining respective state query requests for all servers, wherein the state query requests are heartbeat packets;

sending the respective state query requests to all the servers;

determining respective current running states of all the servers based on the state query requests, wherein when feedback information corresponding to a respective state query request is received within a preset time period, the current running state of a corresponding server is determined to be a normal state, and when the feedback information corresponding to the respective state query request is not received within the preset time period, the current running state of the corresponding server is determined to be an abnormal state; and synchronizing the respective current running states of all the servers to the hardware module, to generate state identifier tables, wherein synchronizing the respective current running states comprises updating the hardware module with state identifiers corresponding to the respective current running states of all the servers, and the state identifier tables comprise the state identifiers used to identify the running states of all the servers.

6. The method according to claim 1, wherein the updating the first server to the second server comprises:

obtaining an access control list used to identify a running state of a server;

determining all candidate servers in a normal state based on the access control list; and determining the second server from the candidate servers, and updating the first server to the second server, wherein packet processing quality corresponding to the second server is higher than packet processing quality corresponding to other servers in the candidate servers.

7. The method according to claim 6, wherein before determining all the candidate servers in the normal state based on the access control list, the method further comprises:

obtaining a server flow table corresponding to the first server based on the access control list; and deleting the server flow table based on the abnormal state of the first server, to obtain an updated access control list.

8. The method according to claim 1, wherein the editing the packet corresponding to the first server based on the second server to obtain the processed packet comprises:

obtaining the configuration information of the second server; and adding the configuration information to a preset field of the packet, to obtain the processed packet.

9. The method according to claim 8, wherein the adding the configuration information to the preset field of the packet to obtain the processed packet comprises:

obtaining a plurality of software modules for packet processing;

determining a target software module corresponding to the packet from the plurality of software modules; and adding the configuration information to the preset field of the packet by using the target software module, to obtain the processed packet.

10. The method according to claim 1, comprising:

determining, in response to invoking a packet processing request, a processing resource corresponding to a packet processing service; and wherein the obtaining the packet, determining the first server corresponding to the packet, updating the first server to the second server, and editing the packet corresponding to the first server based on the second server are performed by using the processing resource.

11. The method according to claim 1, wherein the method further comprises:

determining five-tuple information and executing operation information of the packet, wherein the five-tuple information comprises a source internet protocol (IP) address, a destination IP address, a protocol number, a source port, and a destination port;

determining that the packet hits the first flow table when the first flow table includes the five-tuple information and the executing operation information of the packet; and determining that the packet does not hit the first flow table when the first flow table does not include the five-tuple information and the executing operation information of the packet.

12. A packet processing apparatus, comprising: a memory and a processor, wherein the memory is used to store one or more computer instructions which, when executed by the processor, cause the processor to:

obtain a packet;

determine a first server corresponding to the packet, wherein the first server is used to perform a data processing operation on the packet;

update the first server to a second server when a running state of the first server is an abnormal state, wherein a running state of the second server is a normal state; and edit the packet corresponding to the first server based on the second server, to obtain a processed packet, wherein the processed packet comprises configuration information of the second server, wherein, to determine the first server corresponding to the packet, the processor is further configured to:

obtain a flow table for the packet, wherein the flow table comprises at least one of: a first flow table located in a hardware module or a second flow table located in a software module;

determine the first server corresponding to the packet based on the first flow table, when the packet hits the first flow table; and determine the first server corresponding to the packet based on the second flow table, when the packet does not hit the first flow table.

13. The apparatus according to claim 12, wherein the processor is further caused to:

obtain a flow table for the packet, wherein the flow table comprises at least one of: a first flow table located in a hardware module or a second flow table located in a software module;

determine the first server corresponding to the packet based on the first flow table, when the packet hits the first flow table; and determine the first server corresponding to the packet based on the second flow table, when the packet does not hit the first flow table.

14. The apparatus according to claim 13, wherein the processor is further caused to:

obtain a storage space corresponding to the hardware module, wherein the storage space comprises at least one of: an on-chip cache corresponding to the hardware module, or an off-chip storage space corresponding to the hardware module; and store the first flow table in the storage space.

15. The apparatus according to claim 14, wherein the processor is further caused to:

obtain, through the storage space, first statistical information corresponding to the first flow table, wherein the first statistical information comprises at least one of a flow table statistical table or a service statistical table and is stored in the storage space corresponding to the hardware module;

obtain second statistical information corresponding to the second flow table, wherein the second statistical information comprises at least one of a flow table statistical table or a service statistical table and is stored in a host memory of the software module; and synchronize the second statistical information with the first statistical information by updating the second statistical information based on the first statistical information.

16. The apparatus according to claim 13, wherein after determining the first server corresponding to the packet, the processor is further caused to:

obtain a first state identifier of the first server based on the flow table;

determine a second state identifier of the first server based on a state identifier table corresponding to the first server comprised in the hardware module;

determine that the running state of the first server is a normal state, when the first state identifier is consistent with the second state identifier; and determine that the running state of the first server is an abnormal state, when the first state identifier is inconsistent with the second state identifier.

17. The apparatus according to claim 16, wherein before obtaining the state identifier table corresponding to the first server comprised in the hardware module, the processor is further caused to:

obtain respective state query requests for all servers, wherein the state query requests are heartbeat packets;

send the respective state query requests to all the servers;

determine respective current running states of all the servers based on the state query requests, wherein when feedback information corresponding to a respective state query request is received within a preset time period, the current running state of a corresponding server is determined to be a normal state, and when the feedback information corresponding to the respective state query request is not received within the preset time period, the current running state of the corresponding server is determined to be an abnormal state; and synchronize the respective current running states of all the servers to the hardware module, to generate state identifier tables, wherein synchronizing the respective current running states comprises updating the hardware module with state identifiers corresponding to the respective current running states of all the servers, and the state identifier tables comprise the state identifiers used to identify the running states of all the servers.

18. The apparatus according to claim 13, wherein the processor is further caused to:

determine five-tuple information and executing operation information of the packet, wherein the five-tuple information comprises a source internet protocol (IP) address, a destination IP address, a protocol number, a source port, and a destination port;

determine that the packet hits the first flow table when the first flow table includes the five-tuple information and the executing operation information of the packet; and determine that the packet does not hit the first flow table when the first flow table does not include the five-tuple information and the executing operation information of the packet.

* * * * *